(12) United States Patent
Hatchman

(10) Patent No.: US 6,194,354 B1
(45) Date of Patent: Feb. 27, 2001

(54) DRILLING FLUID CONCENTRATES

(75) Inventor: Kevan Hatchman, Worcestershire (GB)

(73) Assignee: Albright & Wilson UK Limited, West Midlands (GB)

( * ) Notice: Subject to any disclaimer, the term of this patent is extended or adjusted under 35 U.S.C. 154(b) by 0 days.

(21) Appl. No.: 09/156,152

(22) Filed: Sep. 18, 1998

(30) Foreign Application Priority Data

Sep. 20, 1997 (GB) .................................................. 9720014

(51) Int. Cl.$^7$ ...................................................... C09K 7/02
(52) U.S. Cl. .......................... 507/134; 507/136; 507/131; 516/58; 516/900
(58) Field of Search .................................... 507/134, 135, 507/136, 138, 131, 132, 129; 516/58, 75, 76, 900

(56) References Cited

U.S. PATENT DOCUMENTS

| | | | |
|---|---|---|---|
| 4,243,549 | * 1/1981 | Messenger et al. | 516/900 |
| 4,440,665 | * 4/1984 | Mather et al. | 516/900 |
| 4,692,271 | * 9/1987 | Messenger et al. | 516/900 |
| 4,753,754 | * 6/1988 | Messenger et al. | 516/900 |
| 5,523,013 | * 6/1996 | Durbut et al. | 516/900 |
| 5,549,840 | * 8/1996 | Mondin et al. | 516/900 |
| 5,807,810 | * 9/1998 | Blezard et al. | 507/136 |
| 5,964,692 | * 10/1999 | Blezard | 516/58 |

FOREIGN PATENT DOCUMENTS

2304754 * 3/1997 (GB) .

* cited by examiner

Primary Examiner—Philip Tucker
(74) Attorney, Agent, or Firm—Frishauf, Holtz, Goodman, Langer & Chick, P.C.

(57) ABSTRACT

A pourable concentrate suitable for forming structured surfactant drilling muds on dilution with aqueous electrolyte comprises:

a) from 30 to 80% by weight, based on the weight of the composition, of surfactant consisting of at least 25%, based on the weight of the surfactant, of an anionic surfactant, from 0 to 70% by weight, based on the total weight of surfactant, of an alkanolamide, and from 0 to 20% based on the total weight of surfactant, of other non-ionic surfactant and/or amphoteric surfactants;

b) from 3 to 60% by weight of the composition of a compound of the formula RHX where R is hydrogen or a $C_{1-6}$ alkyl group and X is a random or block copolymeric chain comprising a total of from 3 to 20 ethoxy and propoxy units in a relative numerical proportion of 0 to 10:1; and c) up to 65% by weight of water.

9 Claims, No Drawings

DRILLING FLUID CONCENTRATES

The invention relates to concentrates for use in preparing structured surfactant drilling fluids, and especially drilling fluid for use in offshore locations.

The term "Drilling Fluid" is used herein to refer to fluids used in the drilling of bore holes in rock to lubricate and cool drill bits, and to transport rock cuttings away from the rock face. The term is also used herein to include "Spacer Fluids", which are used to clean the sides of bore holes prior to cementing. Drilling Fluids are used in the construction of deep wells and bore holes, and especially oil and gas wells. For convenience the term Drilling Fluid as used herein also embraces "Completion Muds", which are used in civil engineering and the construction industry to stabilise holes and excavations by preventing the breakdown of shales on exposure to water. The term Drilling Fluid is also used herein to include "Packing fluids" which are used in drilling operations to fill the space between concentric, downhole tubing used in the well casing.

"Electrolyte" is used herein to denote those ionic compounds which dissociate at least partially in aqueous solution to provide ions, and which at the concentrations present tend to lower the total solubility (including micellar concentration) of surfactants in such solutions by a "salting out" effect. References herein to the Electrolyte content or concentration refer to the total dissolved Electrolyte, but excludes any suspended solid.

"Micelle" refers to a particle, which is either spherical, disc or rod shaped, formed by aggregation of surfactant molecules and having a radius, or minor dimension less than twice the mean length of the surfactant molecules. The molecules in a Micelle are typically arranged such that their hydrophilic ("head") groups lie on the surface of the Micelle and the lipophillic ("tail") groups are in the interior of the Micelle.

"Bilayer" includes a layer of surfactant approximately two molecules thick, which is formed from two adjacent parallel layers, each comprising surfactant molecules which are disposed such that the lipophillic portions of the molecules are located in the interior of the Bilayer and the hydrophilic portions are located on its outer surfaces. "Bilayer" is also used herein to include interdigited layers, which are less than two molecules thick. An interdigited layer may be regarded as a Bilayer in which the two layers have interpenetrated allowing at least some degree of overlap between the tail groups of the molecules of the two layers.

"Spherulite" means a spherical or spheroidal body having maximum dimensions of from 0.1 to 50 microns. Spherulites may sometimes be distorted into prolate, oblate, pear or dumbell shapes. "Vesicle" means a Spherulite containing a liquid phase bounded by a Bilayer. "Multiple Vesicle" means a Vesicle which contains one or more smaller Vesicles. The Spherulites present in Structured Surfactant systems are typically concentric Multiple Vesicles.

"G" phase refers to a liquid crystal Lamellar Phase, of the type also known in the literature as Lα, "neat" phase or "lamellar" phase. The "G" phase for any given surfactant or surfactant mixture normally exists in a narrow range of concentrations. Pure "G" phases can normally be identified by examination of a sample under a polarising microscope, between crossed polarisers. Characteristic textures are observed in accordance with the classic paper by Rosevear, JAOCS Vol. 31 P628 (1954) or in J. Colloid and Interfacial Science, Vol. 20 No. 4, P.500 (1969). "G" phases normally exhibit lamellar symmetry with a repeat spacing of from 4 to 15 nm, in X-ray diffraction or neutron scattering patterns.

"Spherical G Phase" means Multiple Vesicles formed from substantially concentric shells of surfactant Bilayer alternating with aqueous phase with a "G" phase spacing. Typically conventional G phases may contain a minor proportion of Spherical G Phase.

"Spherulitic Composition" means a composition in which a major part of the surfactant is present as spherical G-phase dispersed in an aqueous phase, or which is principally stabilised against sedimentation by a Spherical G-phase.

"Structured Surfactant" as used herein means a pourable fluid composition which has shear dependent viscosity and solid-suspending properties at least partly conferred by the presence of a surfactant mesophase, which may optionally be dispersed in, or interspersed with an aqueous phase. The mesophase may, for example, be a G-phase or may comprise Spherulites, especially Spherical G-phase. Structured surfactants typically maintain solid particles immobile, when at rest, and display no sedimentation over extended periods of weeks or months, but may be readily poured.

"Weighting Agent" means a water insoluble particulate mineral having a specific density greater than 3.5 and preferably greater than 4 e.g. barite or haematite which imparts increased density to the fluid.

"Drilling Mud" is a Drilling Fluid which contains suspended mineral particles, such as rock cuttings and/or Weighting Agents.

"$L_2$ phase" is a fluid phase comprising surfactant and an organic solvent and/or water wherein the surfactant forms micelles having the hydrophobic portion on the outside of the micelle and any water present in the interior of the micelle. $L_2$ phases are typically Newtonian and optically isotropic and may be distinguished from aqueous based micellar solutions ("$L_2$ phase") by low electrical conductivity, and by a tendency to form G or M phases on dilution with water.

"M" phase is a mesophase in which the surfactant forms cylindrical rods of indefinite length. "M" phases are immobile or viscous, and exhibit characteristic textures under the polarising microscope. They may usually be unambiguously identified by their hexagonal symmetry, which can be detected using small angle x-ray diffraction.

"Shale stabiliser" is a substance which inhibits the disintegration of shale which often occurs in aqueous fluids. This problem can lead to the collapse of the sides of the well when it is drilled through shale.

"Shale inhibitor" is a substance which inhibits the swelling of shale particles in aqueous based mud. This problem can cause the viscosity of the mud to increase. The drilling of oil wells and other boreholes requires the use of drilling fluids which are circulated through the hole to cool and lubricate the drill bit and remove the rock cuttings and transport them to the surface. Conventional drilling muds have been based on oil or on oil/water emulsions. However increasingly strict environmental constraints prevent the release of oil into the sea. Hence offshore installations must either transport oil contaminated rock cuttings ashore for disposal, which would be prohibitively expensive, or develop water based fluids. Two approaches to the latter problem have been suggested. The first involves aqueous solutions of various polymers and the second, the use of structured surfactants. Aqueous polymers capable of providing the required rheological properties generally have poor thermal stability at the temperatures encountered during deep drilling operations and are relatively expensive. Moreover they are generally non-biodegradable and therefore are themselves facing increased environmental constraints.

Drilling muds based on structured surfactants have been described in EPO 430 602 and GB2 304 754. They comprise surfactant mesophases generally interspersed with water to give a non-Newtonian system, which exhibits a yield point capable of maintaining even quite large solid particles indefinitely immobilised in suspension, as if in an immobile gel, while the system is at rest, but which breaks under the shear forces associated with pouring or pumping, enabling the system to be handled as a low viscosity liquid.

Structured surfactants have a number of advantages as drilling muds. Their low viscosity under shear enables them to be readily pumped, while their unique ability to suspend solids when at rest prevents sedimentation in the hole if circulation is halted, and facilitates removal of the cuttings. Structured surfactants are effective shale stabilisers and also help to prevent fluid loss through the sides of the well. Because, in principle, any surfactant is capable of forming a structured system at an appropriate concentration and in the presence of a sufficient amount of electrolyte, there is great flexibility for selecting surfactants to meet the special requirements of different types of drilling operation. In particular surfactants can be selected which meet the strictest environmental criteria, which are cheap and which are able to withstand high temperatures, and/or high electrolyte concentrations.

A problem is the supply of structured surfactant drilling muds to offshore locations. Shipping a complete drilling mud to a rig would be prohibitive, and muds are made up on site using, as far as possible, the one readily available raw material, sea water, with the minimum possible bulk of imported ingredients. There is thus a need to supply the ingredients for drilling muds in as concentrated a form as possible and also to minimise the number of separate components transported.

Surfactants are normally available as dilute aqueous solutions, e.g. less then 30% by weight active concentration. In this form they are usually too dilute to form structured systems with sea water, and are inconvenient to transport. Anhydrous surfactants are generally waxy solids or viscous liquids which are difficult or impossible to disperse in sea water without a degree of heating which is impractical. At concentrations between 30% and 100% surfactants form various mesophases or mixed phases, which are typically either immobile or too viscous or unstable to be useful. Although some organic solvents are known to alleviate the above problems, they are generally unacceptable on grounds of environmental impact, fire hazard or cost. Moreover most solvents inhibit the formation of structured surfactant systems.

We have now discovered that certain mixtures of polyalkoxylates and surfactants are able to provide mobile concentrates which are dilutable with sea water to form structured surfactants. Moreover the polyalkoxylates are valuable as mud ingredients in their own right, e.g. as shale inhibitors thereby effecting a further simplification of the supply problem.

The invention provides a composition for use in structured surfactant drilling fluids which comprises:

(A) from 30 to 80% by weight, based on the weight of the composition, of surfactant consisting of at least 25% based on the weight of surfactant of an anionic surfactant, from 0 to 70% by weight, based on the total weight of surfactant of an alkanolamide and from 0 to 20% based on the total weight of surfactant of other non-ionic surfactants and/or amphoteric surfactants;

(B) from 3 to 60% by weight, based on the weight of the composition, of a compound of the formula RXH where R is hydrogen or a $C_{1-6}$ alkyl group and X is a random or block copolymeric chain comprising a total of from 3 to 20 ethoxy and propoxy units in a relative numerical proportion of 0 to 10:1;

(C) up to 65% by weight, based on the weight of the composition, of water; and the proportions of A and B are such that said composition consists essentially of a spherulitic, lamellar or $L_2$ phase.

The total surfactant is usually present in a proportion greater than 35%, especially greater than 40%, often greater than 45%, preferably more than 50%, e.g. more than 55%, ideally more than 60%, and in some preferred compositions more than 65%. The surfactant usually accounts for less than 75% of the weight of the composition, e.g. less than 70%. Although anhydrous compositions are possible, in practise the compositions normally contain water, usually more than 5% water, often more than 10%, most commonly more than 15%.

The surfactant preferably comprises at least 40% e.g. at least 50% by weight of anionic surfactant. In particular compositions in which more than 70% e.g. 100% of the surfactant is anionic surfactant are favoured. The anionic surfactant is preferably a $C_{10-20}$ alkyl 1 to 20 mole polyethoxy sulphate, more preferably a 2 to 5 mole ethoxy sulphate. Also favoured are alkyl polyethoxy carboxylate. The anionic surfactant may alternatively be a $C_{10-20}$ alkyl sulphate or $C_{10-20}$ alkyl benzene sulphonate. Other anionic surfactants which may, less preferably be present include alkyl sulphosuccinates, alkyl isethionates, alkyl phosphates, taurides, olefin sulphonates, paraffin sulphonates and fatty ester sulphonates.

The counter ion of the anionic surfactant is typically alkali metal preferably sodium or potassium, alternatively it may be ammonium or an amine having up to six carbon atoms such as mono, di or triethanolamine, ethylamine, trimethylamine or isopropylamine. The counter ion may comprise at least a proportion of a polyvalent metal such as calcium where the surfactant is a surfactant, such as alkyl ether sulphate, which is calcium tolerant.

The surfactant may optionally contain a $C_{10-20}$ alkyl ethanolamide e.g. coconut diethanolamide. The alkanolamide may for example be present in a proportion from 5 to 50% by weight, based on the weight of the composition.

In addition to the main surfactant components the surfactant may comprise up to 20% of surfactants selected from: other nonionic surfactants including ethoxylated non-ionic surfactants, such as ethoxylated $C_{10-20}$ alcohols, fatty acids, fatty amines, or glyceryl or sorbitan esters, and amine oxides; and amphoteric surfactants such as betaines, sulphobetaines, imidazoline betaines and alkyl amido propyl betaines. The amount of surfactant other than anionic surfactant and ethanolamide is preferably less than 15% of the total weight of surfactant, more preferably less than 10%, e.g. less than 5%.

We strongly prefer that the surfactant should comprise at least a major proportion, and preferably should consist, of biodegradable surfactants.

The component B is critical to obtaining stable pourable, concentrates at high concentration which can be diluted with sea water without inhibiting the formation of a solid suspending structure. The preferred compound is a $C_{2-4}$ alkyl, e.g. butyl polyalkoxylate comprising a random copolymeric chain of ethyleneoxy and propyleneoxy groups having a mean molecular mass between 300 and 800, e.g. 400 to 700. Preferably the ethylene oxide: propylene oxide ratio is from 1:3 to 3:1, e.g. 1:2 to 2:1. Also preferred are polyalkylene glycols having ethylene oxide; propylene oxide ratios of from 1:3 to 3:1, e.g. 1:2 to 2:1, and preferably mean molecular masses in the range 200 to 700, e.g. 300 to 600, especially 400 to 500, and water insoluble polypropylene glycol having a mean molecular mass less than 600, e.g. less than 500 especially less than 450, e.g. 250 to 400. We prefer that the component B has a cloud point of 20 to 50° C., e.g. 25 to 40° C., especially 30 to 35° C.

We prefer that the component B is present in a proportion of more than 4% by weight of the composition especially more than 5%, typically more than 6%, e.g. more than 8%. The proportion of component B is preferably less than 50% by weight of the composition usually less than 40%, typically less than 30%, e.g. less than 20%.

The compositions of the invention may contain dissolved electrolyte up to saturation. Electrolyte may reduce the viscosity and/or assist in structuring the composition. The electrolyte is usually an alkali metal salt and especially a chloride. Particularly preferred is potassium chloride which contributes to shale inhibition.

The compositions of the invention preferably contain foam inhibitors. Silicone antifoams are preferred, but other foam inhibitors such as mineral oils may also be used. The proportion of foam inhibitor is selected in the normal way, i.e. sufficient to reduce foaming to an acceptable level but, for economic reasons, not in excess of what is required. For typical foam inhibitors the amount used will be more than 0.1, e.g. more than 0.5, commonly more than 1% by weight, but will be less than 5% by weight e.g. 1.5 to 3.5%.

When the compositions of the invention are prepared using the specified proportions of the components A, B and C, they will usually be in the form of lamellar ('G' phase), spherulitic or $L_2$ phase systems. Occasionally an immobile, hexagonal ('M') phase may be obtained, this may generally be avoided by reformulating the composition with more of the component A. Alternatively or additionally the proportion of C may be increased. The addition of electrolyte also tends to suppress the formation of hexagonal phase. If phase separation is observed the formulation can be stabilised by increasing the proportion of C, increasing the proportion of A and/or changing the proportion of electrolyte. If the viscosity of an $L_2$ phase composition is higher than desired, the proportion of B and/or of electrolyte may be increased and/or the proportion of A reduced. Alternatively a less viscous alkoxylate may be selected.

The optimum formulations from the point of view of obtaining the best combination of "pay load" of surfactant with high mobility are $L_2$ phases, which generally require relatively low concentrations of water and relatively high concentrations of surfactant. However, where it is desired to disperse a solid or immiscible liquid in the composition we prefer that the composition should be a structured and especially a spherulitic system. This normally requires relatively high concentrations of electrolyte and water and relatively low proportions of component B.

The compositions of the invention preferably have a room temperature viscosity at 21 $sec^{-1}$ less than 8 Pas, especially less than 4 Pas, desirably less than 3 Pas, typically less than 2 Pas, ideally less than 1 Pas and optimally 0.1 to 0.8 Pas.

Compositions of the invention for use in the preparation of drilling muds, are adapted, on dilution with brine, to form structured surfactant systems. Usually they require from 2 to 10, e.g. 2.5 to 8 volumes of, e.g. sea water. Typically 3 to 7 volumes of sea water are required. In addition extra electrolyte, such as sodium chloride or preferably potassium chloride may be required. Amounts of added electrolyte may be typically up to 25% based on the weight of diluted fluid, e.g. 10 to 20%.

Drilling muds may contain various ingredients in addition to those specified above, and some may, in general, be included in the compositions of the invention, if desired. For example, weighting agents such as calcite, barite or haematite may be suspended in the structured surfactant systems of the invention in amounts usually up to 70% e.g. 10 to 60%, especially 40 to 55% by weight of the weighted fluid. Other ingredients which may be added include fluid loss controlling agents and shale stabilisers such as bentonite. However, due to the fluid loss and shale stabilising properties of the structured surfactant, the latter is not always required in compositions of the present invention. Moreover such additional ingredients are normally added separately when the concentrate is diluted.

Except as herein before provided polymers, and in particular high molecular weight polymers, including gums, resins and polyelectrolytes, hydrotropes, solvents, especially volatile solvents, and non-biodegradable organic materials including oils are generally not required and are preferably absent from the compositions of our inventions. Such components should not generally be present in a total amount exceeding 10% by weight and are preferably present in proportion of less than 8%, e.g. less than 6%, especially less than 4%, more preferably less than 2%, most preferably less than 1% by weight. The presence of such ingredients may prejudice the formation of structured systems. However, in some circumstances small amounts e.g. up to 3% of hydrotropes such as sodium $C_{1\ to\ 6}$ alkyl benzene sulphonates, e.g. xylene sulphonates, toluene sulphonates and cumene sulphonates, may be included to help control viscosity or to inhibit phase separation.

Water soluble salts of polyvalent metals are often included in aqueous based drilling muds as soluble weighting agents. Water soluble calcium, barium, iron strontium and other polyvalent metal salts may be used in this way and may be present up to saturation in the compositions of the present invention, subject to compatibility with the surfactant.

Concentrates according to the invention and also drilling muds formed from them are preferably stable (i.e. no significant sedimentation or phase separation) for at least three months at room temperature and preferably also at 0° C. and at 40° C.

The invention includes a method of preparing drilling muds which comprises diluting a composition according to the invention with sufficient brine and, optionally, additional electrolyte to form a structured surfactant system, and the method of drilling which comprises lubricating the drill bit with said drilling muds. The invention also embraces make-up fluids which contain the ingredients in different proportions to those in the mud. They may be required when components are lost from the system at different rates, or when the composition needs to be adjusted to compensate for, e.g. a change in electrolyte content.

The invention will be illustrated by the following examples in which all %s are by weight based on the weight of the composition unless otherwise stated.

EXAMPLE 1

|  | % |
|---|---|
| Sodium $C_{12-14}$ alkyl 3 mole ethoxysulphate | 60 |
| Butyl 10 mole 1:1 ethoxy/propoxy random copolymer | 12 |
| Silicone antifoam | 2.4 |
| Water | Balance |

The composition was a pourable G-phase which maintained the antifoam in stable suspension. The concentrate was diluted with six volumes of a synthetic sea water, 17% potassium chloride based on the weight of diluted fluid and weighted to a density of 1.5 g $cm^{-3}$ with barite (approximately 50% by weight of the weighted fluid) and bentonite (1 g per 350 mls of weighted fluids). The fluid was a structured (spherulitic) surfactant with a yield point at 48.9° C. of 1.34 $Nm^{-2}$ and viscosity of 0.58 Pas as 21 $sec^{-1}$ and 0.22 Pas at 100 $sec^{-1}$.

EXAMPLE 2

| | % |
|---|---|
| $C_{12-14}$ alkyl 3 mole ethoxysulphate | 40 |
| Coconut diethanolamide | 24 |
| Butyl 10 mole 1:1 ethoxy/propoxy random copolymer | 10 |
| Silicone antifoam | 2.5 |
| Water | Balance |

The product was a pourable G phase. On dilution with 5 volumes sea water and 16% potassium chloride based on the weight of the diluted fluid it provided a spherulitic drilling fluid which stably suspended barite (50% by weight of the weighted fluid) and bentonite (1 g per 350 mls of weighted fluid). The suspension had a yield point of 0.57 Nm−2 and viscosity of 0.51 Pas and 0.26 Pas at 21 and 100 $sec^{-1}$ respectively, all measured at 48.9° C.

EXAMPLE 3

| | % |
|---|---|
| Sodium $C_{12-14}$ alkyl 2 mole ethoxysulphate | 24 |
| Coconut diethanolamide | 48 |
| Butyl 10 mole 1:1 ethoxy/propoxy random copolymer | 12 |
| Water | Balance |

The composition was a stable homogeneous, mobile $L_2$ phase. On dilution with six volumes of synthetic sea water and 16% potassium chloride based on the weight of the diluted fluid a structured spherulitic surfactant system was obtained which formed stable suspensions of barite and bentonite as in Example 1. The yield point was 2.44 $Nm^{-2}$ and the viscosities were 0.42 Pas and 0.27 Pas at 21 $sec^{-1}$ and 100 $sec^{-1}$ respectively (all measurements at 48.9° C.).

EXAMPLE 4

| | % |
|---|---|
| Sodium $C_{12-14}$ alkyl 3 mole ethoxylate | 33.33 |
| Coconut diethanolamide | 8.33 |
| $C_{12-14}$ alkyl betaine | 8.33 |
| Butyl 10 mole 1:1 ethoxy/propoxy random copolymer | 10 |
| Silicone antifoam | 2.5 |
| Water | balance |

The composition was a stable, pourable G-phase which formed a spherulitic structured surfactant on dilution with five volumes of sea water and 16% potassium chloride based on the weight of the diluted fluid. The diluted fluid was weighted with 50% by weight barite based on the weight of the weighted fluid, and 1 g of bentonite was added per 350 ml of the weighted fluid. The resulting suspension was stable and had a yield point of 7.35 $Nm^{-2}$ and viscosity of 0.82 Pas and 0.29 Pas at 21 and 100 $sec^{-1}$ respectively, all measured at 48.9° C.

EXAMPLE 5

| | % |
|---|---|
| Sodium $C_{12-14}$ alkyl 2 mole ethoxy sulphate | 23.34 |
| Coconut diethanolamide | 46.66 |
| Butyl 10 mole 1:1 ethoxy/propoxy random copolymer | 14 |
| Water | balance |

The product was a clear, stable, homogeneous and mobile $L_2$ phase which formed a spherulitic structured surfactant on dilution with seven volumes of sea water and 16% potassium chloride based on the weight of the diluted fluid. The dilute fluid was weighted with 50% by weight barite based on the weight of the weighted fluid, and 1 g of bentonite was added per 350 ml of the weighted fluid. The suspension was stable and had a yield point of 0.31 $Nm^{-2}$ and a viscosity of 0.31 Pas and 0.2 Pas at 21 and 100 $sec^{-1}$ respectively, all measured at 48.9° C.

EXAMPLE 6

| | % |
|---|---|
| Sodium $C_{12-14}$ alkyl 2 mole ethoxy sulphate | 23.33 |
| Coconut diethanolamide | 46.67 |
| Butyl 10 mole ethoxy/propoxy random copolymer | 28 |
| Water | balance |

The composition was a stable, clear, homogeneous, pourable $L_2$ phase which can be diluted readily with seven volumes of sea water and 16% potassium chloride by weight, based on the weight of the diluted fluid to form a spherulitic structured surfactant. The diluted fluid can be weighted with 50% by weight barite based on the weight of the weighted fluid, and 1 g of bentonite may be added per 350 ml of weighted fluid. The suspension is stable and has good rheological properties.

What is claimed is:

1. A lamellar, spherulitic or $L_2$ phase composition consisting essentially of:
   (A) from 45 to 80% by weight of the composition of surfactant consisting essentially of at least 50% based on the total weight of surfactant of $C_{10-20}$ alkyl 1–20 mole ethoxy sulfate, up to 50% by weight of $C_{10-20}$ alkyl mono- or di-ethanolamide and up to 20% by weight of the surfactant of other non-ionic surfactants selected from the group consisting of ethoxylated $C_{10}$–$C_{20}$ alcohols, fatty acids, fatty amines, glyceryl esters, sorbitan esters and amine oxides, and/or amphoteric surfactants;
   (B) from 6 to 40% by weight based on the weight of the composition of a $C_{2-4}$ alkyl ethoxy/propoxy copolymer, the copolymeric portion having an ethoxy to propoxy mole ratio of from 1:3 to 3:1 and a mean molecular mass of 300 to 800; and
   (C) water.

2. A drilling fluid comprising the composition of claim 1 and 2–10 parts by volume, based on the volume of said composition, of sea water and an effective amount of up to 25% by weight of an added electrolyte.

3. The composition of claim 1, wherein said surfactant (A) includes from 5 to 50% by weight of a $C_{10-20}$ alkyl mono or di ethanolamide.

4. The composition of claim 1, which consists essentially of a spherulitic or lamellar phase and which contains from 1 to 5% by weight of foam inhibitor.

5. The drilling fluid of claim 2, wherein the amount of said added electrolyte mixed with said composition to produce said drilling fluid is from 10% to 20% by weight.

6. The drilling fluid of claim 2, wherein said added electrolyte is potassium chloride.

7. The drilling fluid of claim 2, additionally containing at least one weighting agent.

8. The drilling fluid of claim 7, wherein said weighting agent is added to said composition in an amount of 0 to 60% by weight.

9. The drilling fluid of claim 7, wherein said weighting agent is selected from the group consisting of calcite, barite and haematite.

* * * * *